United States Patent [19]

Glebov et al.

[11] 4,342,932
[45] Aug. 3, 1982

[54] ROTOR OF CRYOGENIC ELECTRICAL MACHINE

[76] Inventors: Igor A. Glebov, prospekt Smirnova, 24, Korpus 3, Kv. 52; Yanush B. Danilevich, ulitsa Tipanova, 29, Kv. 681; Sergeia A. Ivanov, ulitsa Siezzhinskaya, 24, Kv. 12; Anatoly A. Karymov, Sredny prospekt, 49, kv. 5; Galina A. Kotlyarova, prospekt Shaumiana, 58, kv. 22; Vladimir A. Sapozhnikov, prospekt Kultury, 11, korpus 1, kv. 145; Valentin N. Shakhtarin, prospekt Metallistov, 14, kv. 6, all of Leningrad, U.S.S.R.

[21] Appl. No.: 121,262

[22] Filed: Feb. 13, 1980

[30] Foreign Application Priority Data

Feb. 15, 1979 [SU] U.S.S.R. .............................. 2725190

[51] Int. Cl.³ ............................................. H02K 9/00
[52] U.S. Cl. ........................................ 310/52; 310/61; 310/261
[58] Field of Search ................... 310/10, 40, 57, 52, 310/54, 58, 64, 65, 45, 194, 214, 215, 201, 208, 165, 261, 271, 43

[56] References Cited

U.S. PATENT DOCUMENTS

| | | | |
|---|---|---|---|
| 2,664,512 | 12/1953 | Huntley | 310/64 |
| 3,408,516 | 10/1968 | Kudlacik | 310/214 |
| 3,991,333 | 11/1976 | Laskaris | 310/261 |
| 4,082,967 | 4/1978 | Laskaris | 310/10 |
| 4,151,639 | 5/1979 | Weghaupt | 310/54 |
| 4,152,610 | 5/1979 | Wallenstein | 310/214 |
| 4,176,291 | 11/1979 | Rabinowitz | 310/261 |
| 4,176,292 | 11/1979 | Kalsi | 310/261 |

FOREIGN PATENT DOCUMENTS 54-7509  1/1979  Japan .................................... 310/45

OTHER PUBLICATIONS

"Component Development For A 20-MVA Superconducting Generator" P. A. Rios et al., pp. 1-19, 1977, World Electrochemical Congress.

Primary Examiner—R. Skudy
Attorney, Agent, or Firm—McAulay, Fields, Fisher, Goldstein & Nissen

[57] ABSTRACT

Disclosed is a rotor of a cryogenic electrical machine, comprising a superconducting field winding consisting of flat coils each of which is enclosed in a housing having therein tangential and axial passages, metal partitions disposed between the coils, an electrically insulating material, radial passages communicating the central cavity of the rotor with the tangential passages of the housing, and a bandage embracing the coils separated by said partitions, each housing being made up of a base embraced by the coil, wedges and inserts, radial passages being formed in the bases and wedges of the housings, and the electrically insulating material being made as strips forming passages communicating the radial passages of the bases and wedges.

3 Claims, 6 Drawing Figures

ROTOR OF CRYOGENIC ELECTRICAL MACHINE

FIELD OF THE INVENTION

The present invention relates to electrical engineering, and more particularly to rotors of cryogenic electrical machines.

The invention can be used most advantageously in large electric machines, such as turbogenerators.

BACKGROUND OF THE INVENTION

At present, to improve the performance and economic characteristics of electrical machines as well as their serviceability, in the electrical engineering of highly developed countries there is a strong trend towards the increase of power in a single assembly.

The increase of power in an electrical machine is achieved either by intensified cooling of active parts of the machine (stator windings, rotor windings, etc.) making it possible to increase current density in the windings and to improve heat removal from the heated parts, or by enlarging the size of electrical machines.

At present, to increase the output of electrical machines, there is a tendency to intensify cooling of its active parts, which is economically most advantageous.

In large-sized electrical machines with superconducting field windings, the efficiency of operation is dependent in many respects on the cooling system of the winding.

Known in the art is a rotor of a cryogenic electrical machine, comprising a solid support structure formed as a massive carrying cylinder having in its outer surface slots and an U-shaped electrical insulation, and a superconducting field winding consisting of separate coils laid into the slots of the carrying cylinder and retained therein by a bandage cylinder.

The cooling system of the winding comprises axial passages to distribute the coolant around the periphery of the carrying cylinder and radial passages communicating with the axial passages through openings in the outer surface of the partitions between the slots of the carrying cylinder. The axial passages are formed in the partitions between the slots of the carrying cylinder, and the radial passages are formed in the inside of the U-shaped slot insulation and are interconnected along the slot bottom (Federal Republic of Germany application No. [2,511,104], 1976, Int. Cl. H02K 9/19).

The coolant supplied through the axial feeding passage passes through the openings in the outside of the partition into the radial passages of the U-shaped insulation and then flows through the passage portions in the slot bottom into the radial passages in the opposite side of the slot insulation wherefrom through the opening in the outside of the partition it is fed into the axial passage for discharging the coolant from the winding.

However, local heat evolutions in the superconducting field winding of the above rotor may bring about conditions under which caused by the separation of the coolant vapour-liquid mixture due to centrifugal forces is the accumulation of a vapour phase resulting in passage blocking which affects cooling conditions and decreases current-carrying capacity of the superconductor.

Keeping the passage from being blocked by increasing pressure at the point of coolant supply results in its temperature rise and, besides, requires additional means to be provided to raise the pressure of the coolant at the point of its supply.

In case of non-uniform heat generation along the rotor, locks may be formed in some but not all of the passages, which results in redistribution of the coolant flow rate along other passages, this phenomenon being irreversible. Besides, forming the axial passages in the partitions of the carrying cylinder makes it necessary to thicken the partitions, which results in poor utilization of the rotor active zone.

Formation of vapour locks blocking cooling passages of the superconducting field winding is eliminated in the rotor of a cryogenic electrical machine selected as the prototype of the present invention. The rotor comprises a superconducting field winding consisting of race-track-shaped flat coils each of which is enclosed in a housing of a rectangular shape whose inner surface is machined to fit around the outer surface of the coil in close tolerance and which is completed with interconnected tangential and axial passages. Each coil is squeezed on its side surfaces between metal partitions having radial passages formed therein within the limits of the straight portion of the coil and communicating the central coolant-filled cavity of the rotor with the tangential passages of the housing. Besides, formed in the metal partitions are axial passages to discharge the coolant from the central cavity of the rotor. The electric insulation of the coil is formed by a layer of fiber glass provided on the inside and outside thereof and by an electrically insulating film provided on the side portions of the coil. The entire winding assembled with the housings and metal partitions is embraced by a metal bandage. ("Component Development for a 20-MBA Superconducting Generator" WELC, Moscow, 1977, paper 1.39).

The coolant flows along the passages in the following way. The liquid coolant flows through the axial passages provided in the outer surface of the housing from the end of the field coil, into the tangential passages of the housing wherefrom it is fed into the radial passages formed in the metal partitions and then into the central cavity of the rotor. The vapour phase of the coolant is removed from the central cavity of the rotor through the axial passages made in the metal partitions.

However, there occurs an indirect cooling of the superconductor through the insulation layer in said rotor, which affects the conditions of cooling of the superconducting field winding and hence decreases current carrying capacity of the superconductor.

Besides, each coil should be wound, impregnated and potted separately from the rotor body, whereupon a high-precision machining of the outer surface of the coil is required to obtain an appropriate shape and tolerances between coils and their housings. When assembling the winding, each coil is inserted into its housing, after which the coils with their housings are separated by metal partitions and held together by bolts. In such construction of the winding, the coil is held in the housing due to a precise machining of the mated surfaces of the housing and coil, which appreciably complicates the process of manufacture. Inaccuracy of machining may affect the solidity of the winding, cause displacements of the coils with respect to the partitions and housings and, hence, result in friction losses promoting a local temperature rise of the superconductor and decrease of its current carrying capacity.

It should be noted that forming of radial passages in the metal partitions result in the increase of the partition thickness, which affects utilization of the rotor active zone.

SUMMARY OF THE INVENTION

It is an object of the present invention to increase the efficiency of cooling of the superconducting field winding of the rotor of a cryogenic electrical machine.

Another object of the present invention is to improve the process of manufacture of the superconducting field winding of the rotor of a cryogenic electrical machine.

Still another object of the present invention is to improve the utilization of the rotor active zone.

Yet another object of the present invention is to improve the solidity of the superconducting field winding of the rotor of a cryogenic electrical machine.

With these and other objects in view there is provided a rotor of a cryogenic electrical machine, comprising a superconducting field winding consisting of flat coils enclosed each in a housing having therein interconnected tangential and axial passages, metal partitions disposed between the coils, an electrically insulating material, radial passages communicating the central cavity of the rotor with the tangential passages, and a bandage embracing the coils separated by said partitions, wherein, according to the invention, each of the housings consists of a base embraced by the coil, wedges and inserts, the radial passages are formed respectively in the bases and wedges of the housings, and the electrically insulating material is made as strips forming passages communicating the radial passages in the wedges with the radial passages in the bases.

The housing consisting of the base, wedges and inserts makes it possible to improve the processability and solidity of the superconducting field winding by providing a means for simultaneous winding of all the coils directly onto the support structure of the winding and concurrent impregnation and potting of the entire winding.

Making the electrically insulating material as strips forming the passages communicating the radial passages of the bases and wedges enables direct cooling of the coil surfaces, which makes it possible to increase the efficiency of cooling of the superconducting field winding and to reduce the thickness of the metal partitions, thus improving utilization of the rotor active zone.

The radial passages provided in the bases and wedges make it possible to obtain an integrated passage communicating the tangential passages of the housings with the central cavity of the rotor.

These and other objects and advantages of the present invention will become more apparent upon consideration of the following detailed description of its embodiments taken in conjunction with the accompanying drawings, in which:

BRIEF DESCRIPTION OF THE ACCOMPANYING DRAWINGS

DETAILED DESCRIPTION OF THE INVENTION

Figure 2:
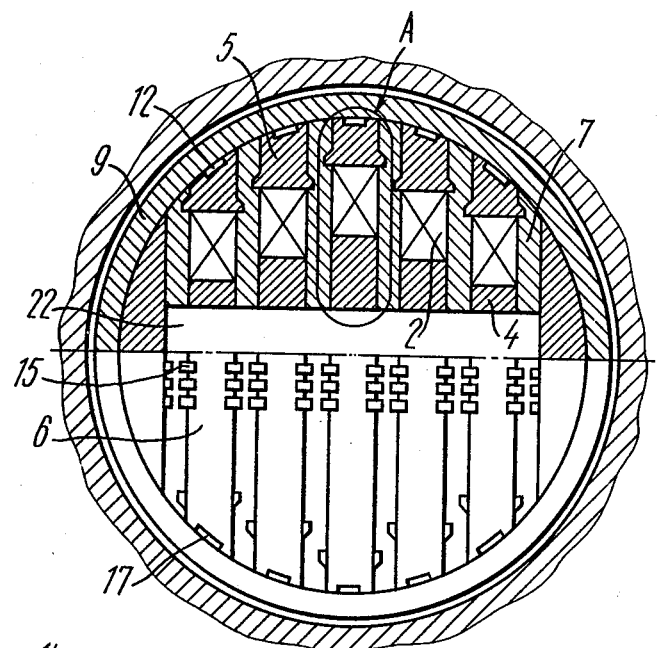
FIG. 2 shows a cross-sectional view of a rotor of a cryogenic electrical machine.
Figure 3:
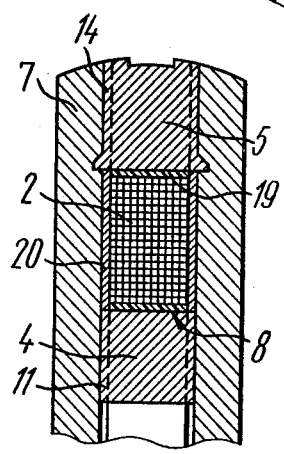
FIG. 3 shows an enlarged view of the unit A of FIG. 2.

The rotor of a cryogenic electrical machine comprises a superconducting field winding 1 (FIG. 1) consisting of race racetrack-shaped flat coils 2 (FIG. 1) each of which is enclosed in a housing 3 composed of a base 4, wedges 5 and inserts 6, separated from the adjacent coils 2 by metal partitions 7 (FIG. 2), and insulated from the housing 3 and metal partitions 7 by an electrical insulation 8 (FIG. 3). The coils 2 (FIG. 2) separated by the metal partitions 7 are embraced by a cylindric bandage 9 made of non-magnetic steel or some other alloy.

Figure 4:
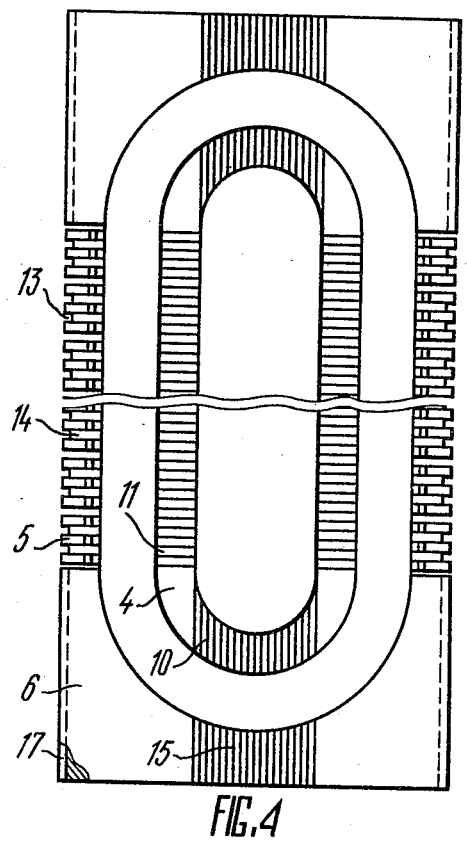
FIG. 4 shows an enlarged front view of the housing of the superconducting field winding.

The base 4 (FIG. 4) represents a support plate of an racetrack shape with an inner opening. Milled in the bases 4 are axial passages 10 and radial passages 11.

Figure 5:
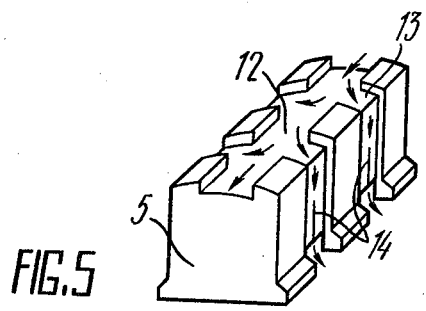
FIG. 5 shows an axonometric view of one of the wedges of the housing, the flow direction of the coolant being indicated by arrows.

The wedges 5 (FIG. 5) are formed as a dovetail. Milled in each wedge 5 are an axial passage 12 and radial passages 14 communicating therewith through tangential passages 13. The inserts 6 (FIGS. 1 and 4) represent plates embracing the end portions of the coils 2. The inner surfaces of the inserts 6 are machined to the shape of the end portions of the coils 2. The inserts 6 have axial passages 15 communicating with the axial passages 10 of the base 4 and with passages 16 (FIG. 1) of a heat exchanger, and axial passages 17 communicating with the axial passages 12 of the wedges 5 and with a pipe 18 wherethrough the coolant is fed into the rotor cavity.

The metal partitions 7 (FIG. 2) represent plates of an racetrack shape with an inner opening.

Figure 6:
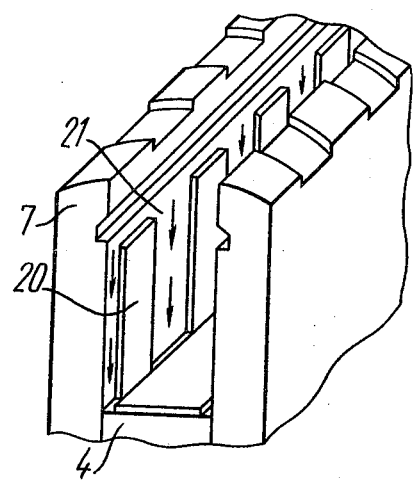
FIG. 6 shows an axonometric view of metal partitions with the strips of an electrically insulating material disposed thereon, the flow direction of the coolant being indicated by arrows.

The electrical insulation 8 (FIG. 3) is formed by a layer 19 of fiber glass covering the surfaces of the coils adjacent to the housings and by an insulating film provided on the side portions of the coil 2, made as strips 20 (FIG. 6) fixed to the metal partitions 7 and forming in the clearance therebetween passages 21 communicating the radial passages 11 (FIG. 4) in the bases 4 with the radial passages 14 in the wedges 5.

The bases 4 (FIG. 2) and the metal partitions 7 are bolted together forming the support structure of the winding.

The openings of the bases 4 and metal partitions 7 form the central cavity 22 of the rotor.

The bases 4 (FIG. 1) are the supporting elements whereon the coils 2 are wound.

After simultaneous winding of all the coils 2, the entire winding 1 is impregnated and potted, which improves its solidity.

The wedges 5 are used to fix the coil 2 at its straight portions between the metal partitions 7, while the inserts 6 fix the end portions of the coils 2.

The radial passages 11 in the bases 4 and the radial passages 14 in the wedges 5 communicate the tangential passages 13 provided in the wedges 5 with the central cavity 22 of the rotor.

Cooling of the superconducting field winding of the rotor of a cryogenic electrical machine is performed as follows.

Figure 1:
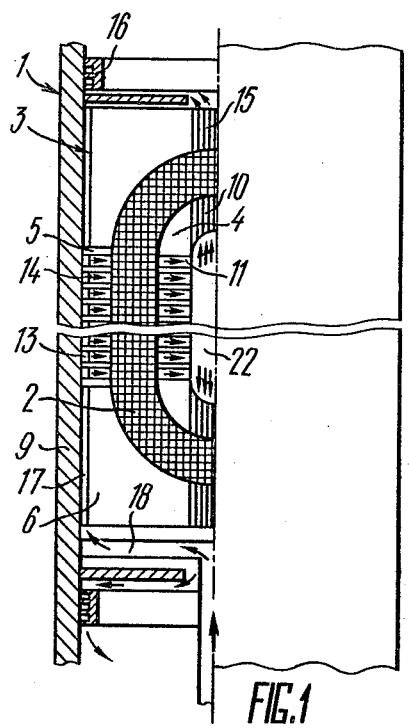
FIG. 1 shows a longitudinal section of a rotor of a cryogenic electrical machine according to the present invention, the flow direction of coolant being shown by arrows.

The coolant, such as liquid helium, is fed into the rotor by means of the pipe 18 (FIG. 1). The coolant flows into the axial passages 17 of the inserts 6 and, passing therethrough, gets into the axial passages 12 (FIG. 2) of the wedges 5 and then fed along the tangential passages 13 (FIG. 4) of the wedges 5 through the radial passages 14 of the wedges 5 into the passages 21 (FIG. 6) communicating therewith and formed by the strips 20 of an electrically insulating material and into the radial passages 11 (FIG. 1) of the bases 4. From the radial passages 11 of the bases 4 the vapour-liquid mixture of the coolant is fed into the central cavity 22 of the rotor. The vapour of the coolant gets through the axial passages 10 of the bases 4 and axial passages 15 of the inserts 6 into the passages 16 of the heat exchanger and then to the outlet from the rotor. Under the influence of centrifugal forces, the liquid coolant is distributed over the inner surface of the bandage 9, thus forming a layer wherein the straight portions of the coils are immersed, and the vapour phase collects in the central cavity 22 of the rotor.

The centrifugal forces promote separation of the vapour phase and ensure its flow toward the rotor axis.

Under abnormal operating conditions of the rotor the system of passages makes it possible to supply the increased amount of the coolant to the superconducting field winding without any difficulties.

The system of passages in the housing and adjacent to the side surface of the coils runs through the whole thickness of the superconducting field winding and provides an ordered flow of the coolant from the periphery to the centre without counterflows of liquid and vapour phases and without uncontrolled vortex flows.

From the specific embodiments of the present invention considered hereinabove, it is readily apparent to those skilled in the art that all the objects of the invention can be accomplished within the scope of the appended claim.

The aforementioned embodiments of the invention do not limit the scope of the latter and are given merely as an illustration. It is also apparent that insignificant changes in the construction of the device can be made without departing from the spirit of the invention.

All these insignificant changes are considered to be within the spirit and scope of the invention as defined in the claim below.

The proposed rotor of a cryogenic electrical machine makes it possible to increase the efficiency of cooling of the superconducting field winding, which brings about the improvement of its current carrying capacity and hence the increase of the output of an electrical machine.

Besides, improved are the processability of the superconducting field winding and utilization of the active zone of the rotor of a cryogenic electric machine.

What is claimed is:

1. A rotor of a cryogenic machine of the type which includes a plurality of flat superconducting field windings assembled into a cylindrical rotor, said cylindrical rotor being surrounded by a bandage, comprising:
a first plurality of passages inside said bandage;
means for feeding a cryogenic cooling liquid into said first plurality of passages;
a central cavity on the axis of said rotor inside said field windings;
a second plurality of radial passages effective for communicating said cryogenic cooling liquid in unidirectional inward flow from said first plurality of passages to said central cavity, said cryogenic cooling liquid in said second plurality of radial passages contacting and absorbing heat from said field windings during said unidirectional flow therepast; and
a third plurality of axial passages communicating said cryogenic cooling liquid and vapor phase evolved therefrom in unidirectional flow from said central cavity to axial locations outside said field windings, whereby unidirectional flow of liquid, and vapor phase is provided through said rotor without counter flow thereof.

2. A rotor according to claim 1, further comprising:
a plurality of generally parallel metal partitions;
a plurality of bases, each base being disposed between an adjacent pair of said parallel partitions;
a central cavity in each of said bases;
each of said field windings being wound as a flat coil on one of said bases between said pair of partitions;
a plurality of spaced apart insulating strips between each of said field windings and its respective metal partitions, said strips being effective to support said field winding out of electrical contact with said metal partitions;
wedges affixed between adjacent pairs of metal partitions and each wedge embracing a straight portion of one of said field windings;
a plurality of inserts each affixed between an adjacent pair of parallel plates and embracing a curved portion of one of said field windings;
said first plurality of passages being disposed between said wedges and said bandage;
said second plurality of radial passages including passages through said wedges, gaps between adjacent ones of said insulating strips, and interconnected passages through said wedges and said bases whereby cooling cryogenic liquid is communicated radially from said first plurality of passages to said central cavity; and
said third plurality of axial passages including interconnected axial passages in said bases and said inserts.

3. A rotor according to claim 1, wherein portions of said rotor inside said bandage are rigidly interconnected by impregnation and potting.

* * * * *